No. 624,420. Patented May 2, 1899.
G. E. ATWATER & T. C. ELDREDGE.
HORSE VAPOR BATH.
(Application filed Oct. 15, 1898.)
(No Model.) 2 Sheets—Sheet 1.
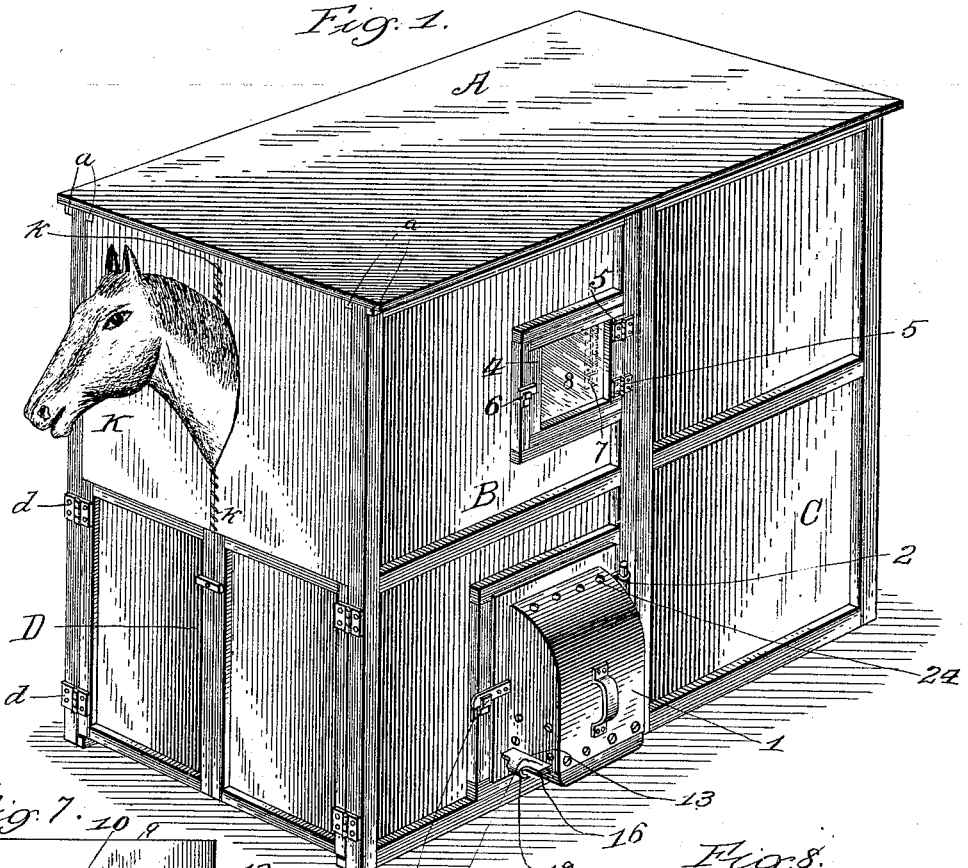
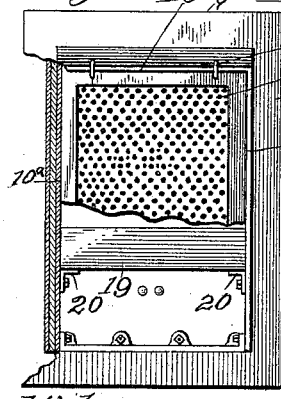
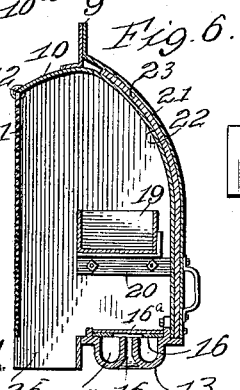
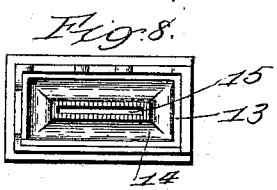
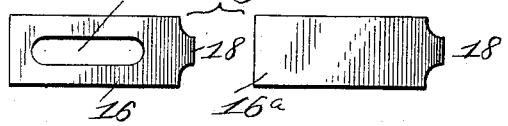
Witnesses:
Herbert Bradley
Harry G. Knight
Inventors:
Thomas C. Eldredge.
George E. Atwater.
By Knight Bros
Attorneys.

No. 624,420. Patented May 2, 1899.
G. E. ATWATER & T. C. ELDREDGE.
HORSE VAPOR BATH.
(Application filed Oct. 15, 1898.)
(No Model.) 2 Sheets—Sheet 2.
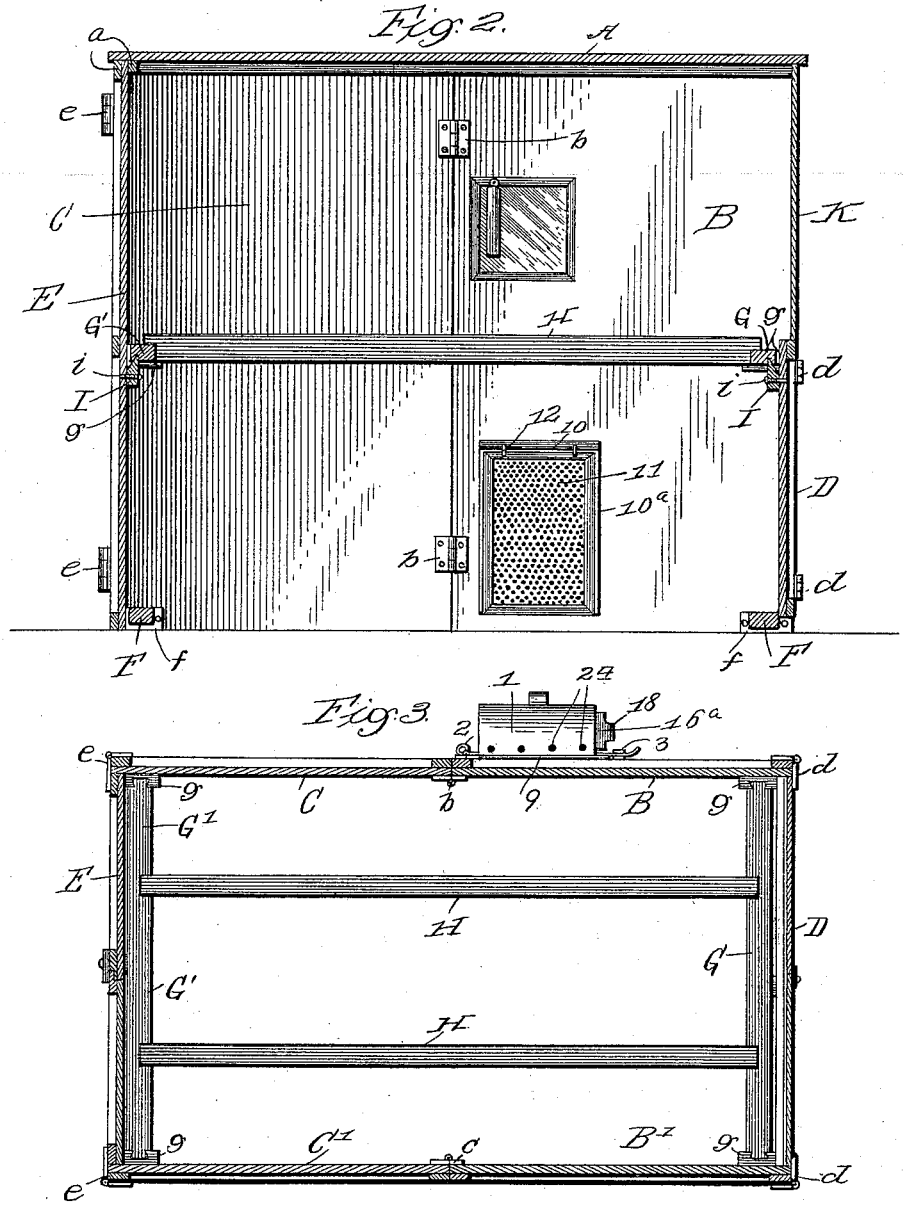
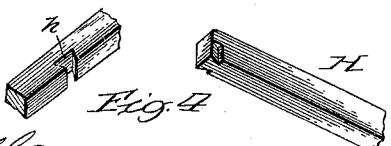
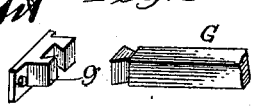
Witnesses:
Herbert Bradley
Harry A. Knight
Inventors.
Thomas C. Eldredge.
George E. Atwater.
By Knight Bros
Attorneys.

UNITED STATES PATENT OFFICE.

GEORGE E. ATWATER AND THOMAS C. ELDREDGE, OF YANKTON, SOUTH DAKOTA.

HORSE VAPOR-BATH.

SPECIFICATION forming part of Letters Patent No. 624,420, dated May 2, 1899.

Application filed October 15, 1898. Serial No. 693,665. (No model.)

*To all whom it may concern:*

Be it known that we, GEORGE E. ATWATER and THOMAS C. ELDREDGE, citizens of the United States, and residents of Yankton, in the county of Yankton and State of South Dakota, have invented certain new and useful Improvements in Live-Stock Vapor-Baths, of which the following is a specification.

Our invention relates to apparatus by which horses or other live stock may be subjected to vapor-baths, and has for its objects to provide a substantial but conveniently portable or knockdown closure in which the animal may be tightly inclosed and securely held without injury to itself or to the closure, with the head protruding, if desired, and to provide means for circulating through the closure a controllable supply of vaporous medicant and for regulating the character and temperature of the same, and means for permitting observation and regulation of the temperature and conditions of the bath, as well as its effect upon the animal treated.

Our invention consists of certain novel features of construction which will be hereinafter fully described, and particularly pointed out in the claims, reference being had to the accompanying drawings, in which—

Figure 1 is a perspective view of a vapor-bath embodying the features of our invention and in which a horse is shown confined for treatment. Fig. 2 is a vertical longitudinal section of the closure, looking at the inside of the side wall which is presented to view in Fig. 1. Fig. 3 is a horizontal section of Figs. 1 and 2, taken just above the plane of the bracing and supporting rails and confining-bars. Fig. 4 is a detail view of the form of joint employed for detachably connecting the confining-bars to the bracing and supporting rails. Fig. 5 is a detail view of the connections between the base tie-sills and end bars and the sides. Fig. 6 is a vertical section from front to rear of the heater. Fig. 7 is an elevation of the same, looking at its inner face. Fig. 8 is a plan of the evaporating-pan which forms the bottom of the heater. Fig. 9 represents the slides for regulating the evaporation of vapor from and transmission of heat through the pan.

The closure is preferably bottomless, so that the animal stands upon the ground or floor upon which the apparatus is set up, and it comprises top A; the two-part folding sides B C and B' C'; having their parts hinged together by hinges *b c;* head-gates D, closing the lower portion of the front end and respectively supported through hinges *d* upon the side portions B B'; the tail-gates E, completely closing the rear end and respectively supported by hinges *e* upon the side portions C C'; bottom tie-sills F, fitting in and detachably connected through dovetail sockets *f*, Figs. 2 and 5, carried by the lower corners of the side portions B C and B' C'; front and rear bracing supporting-rails G G', detachably connected to and tying together the sides B C B' C' through the medium of the dovetail sockets *g g*, and the confining-bars H H', extending between the bracing and supporting rails G G' and detachably connected to them by dovetail joints *h*, Figs. 2, 3, and 4.

One of each pair of end doors D and E carries a bracket I, secured thereto by bolt *i* and arranged to enter a socket in the supporting and bracing end bar as the latter is put in place, whereby such door is held securely closed. The end may likewise hold its companion door through a suitable button or other device.

By the construction above described the sides and ends of the closure are securely locked and braced into a rigid structure, but may readily be detached and folded together for transportation. The structure is further braced by the top, and the latter is held in place through the medium of strips *a*, formed to embrace the upper edges of the sides and rear doors.

K represents a split canvas or other flexible closure for the upper part of the front opening and which may be so laced, as shown at Fig. 1, about the animal's neck as to allow the head to protrude, while maintaining a sufficiently-tight closure. The closure is provided with a heater 1, inserted in an opening in the wall and held in place by hinges 2, upon which it may be swung out to give access to its interior for purposes which will hereinafter appear, and latch 3. The closure is further provided with a glazed window 4, hinged at 5 and latched at 6 and disclosing a thermometer 7 through its glass 8, so that the temperature of the interior may be readily determined. The glass likewise permits inspection of the animal and observation of the condition and effects of the vapor during treatment. The door may also be opened to various degrees to modify the interior conditions by communication with the outer atmosphere.

The heater 1 is preferably formed with an upwardly and inwardly deflecting outer wall and straight sides and is fitted to the opening in the side of the closure by means of vertical flange 9 and inwardly-projecting flanges 10 10ª. Depending from the top flange 10 is a diffusing-screen 11, preferably supported by a hinged connection, such as rings 12, and fitting between side flanges 10ª, but terminating short of the bottom. 13 is an evaporating-pan which constitutes the bottom of the heater and is formed with an elliptical bowl 14 for the reception of liquid or other material to be vaporized and with an elongated central passage 15 for the passage of heated air for establishing the necessary current to carry up the vapor. Evaporation from pan 13, as well as the passage of air through opening 15, are graduated or wholly cut off by means of dampers 16 16ª, one of which, 16, is provided with a slot 17 and restricts the escape opening past the heater to the dimensions of said slot 17, while the other is unbroken and is inserted to a greater or less extent to regulate the degree of opening through slot 17. The dampers are provided with handles 18 and may be inserted through an opening 13 in the heater 1.

19 is a tray supported by brackets 20 and in which may be placed a medicant of any kind and the properties of which it is desired to impart to the vapor generated below or in which liquid may be placed to be evaporated. The outer wall of the heater is preferably made of two shells 21 22, so as to leave an interior space 23, which communicates at top, through vents 24, with the outer atmosphere. The heater is open at its bottom, as shown at 25, for the free ingress of the atmosphere to the closure, so that the latter is made to circulate through the heater and to become impregnated or ladened with the vaporous medicant used, a thorough mixture being insured by means of the diffusing-screen 11.

The necessary heat for evaporating the contents of pan 13 and tray 19 is obtained from any suitable source applied beneath the pan 13.

Having thus described our invention, the following is what we claim as new therein and desire to secure by Letters Patent:

1. In a vapor-bath, a closure constructed of detachable or folding top, sides and ends, the bracing and tying sills and bars arranged transversely thereof at bottom and at an intermediate height and detachably connected to said sides, the longitudinal confining and bracing rails detachably connected to the intermediate bars, and a suitable heater, all substantially as and for the purpose set forth.

2. In a vapor-bath, the combination of the separable or folding top and sides, the end doors hinged to adjacent portions of the sides, the bottom tie-sills and intermediately-placed supporting and bracing bars, the dovetail sockets attached to the sides, and in which the ends of said sills and bars are fitted, the confining and bracing rails dovetail-jointed in the intermediately-placed bars, brackets on the doors entering sockets in the bars as the latter are placed in position, and a suitable heater, substantially as and for the purpose set forth.

3. In a vapor-bath, a closure, a heater comprising a suitable casing adapted to fit partly into the side wall of the closure from the outside of the latter, and a pan in the bottom of said heater formed with a central opening and a surrounding bowl, substantially as and for the purpose set forth.

4. In a vapor-bath, a heater comprising a suitable casing, an evaporating-pan in the bottom thereof formed with a central elongated opening and a surrounding elliptical bowl and dampers fitted to the top of said pan, one of which is formed with an opening, substantially as and for the purpose set forth.

5. In a vapor-bath the combination of a suitable closure and a heater comprising a casing fitting partly into the side wall, a pan in the bottom of said casing, and a tray mounted above the pan, substantially as and for the purpose set forth.

6. In a vapor-bath, the combination of a closure, and a heater comprising a casing fitted partly into the side wall of the closure, vaporizing-receptacle in said casing, and a vertical diffusing-screen dividing the heater from the closure, substantially as and for the purpose set forth.

7. In a vapor-bath the combination of the closure, and the heater fitted partly in an opening in the side wall of the closure and comprising a vaporizing-receptacle and a diffusing-screen, the heater communicating with the closure through the screen, and also beneath the same, substantially as and for the purpose set forth.

8. In a vapor-bath the combination of the closure, the heater fitted partly in the side wall of the closure by the vertical and inwardly-projecting flanges, an evaporating-receptacle in said heater and a diffusing-screen depending from the top inwardly-projecting flange and fitting between the side inwardly-projecting flanges, substantially as and for the purpose set forth.

GEORGE E. ATWATER.
THOMAS C. ELDREDGE.

Witnesses:
BONNEY C. WOOLLEY,
OSSEAN B. WOOLLEY.